US012013104B2

(12) United States Patent
Dai et al.

(10) Patent No.: US 12,013,104 B2
(45) Date of Patent: Jun. 18, 2024

(54) POINT LIGHT-SOURCE, LAMP, ASSEMBLY, AND SYSTEM

(71) Applicant: Shenzhen Intellirocks Tech. Co., Ltd., Shenzhen (CN)

(72) Inventors: Jun Dai, Shenzhen (CN); Chunbo Zhang, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/354,825

(22) Filed: Jul. 19, 2023

(65) Prior Publication Data

US 2024/0035652 A1 Feb. 1, 2024

(30) Foreign Application Priority Data

Jul. 28, 2022 (CN) ......................... 202221979646.5
Dec. 7, 2022 (CN) ......................... 202223297625.8

(51) Int. Cl.

| | |
|---|---|
| ***F21V 23/00*** | (2015.01) |
| ***F21S 4/00*** | (2016.01) |
| ***F21V 23/02*** | (2006.01) |
| ***F21Y 115/10*** | (2016.01) |
| ***H05B 45/10*** | (2020.01) |
| ***H05B 45/325*** | (2020.01) |
| ***H05B 45/345*** | (2020.01) |

(52) U.S. Cl.
CPC .............. *F21V 23/009* (2013.01); *F21S 4/00* (2013.01); *F21V 23/023* (2013.01); *H05B 45/10* (2020.01); *H05B 45/325* (2020.01); *F21Y 2115/10* (2016.08); *H05B 45/345* (2020.01)

(58) Field of Classification Search
CPC ... F21V 23/009; F21V 23/023; H05B 45/325; H05B 45/10; F21S 4/00
See application file for complete search history.

(56) References Cited

U.S. PATENT DOCUMENTS

| | | | | |
|---|---|---|---|---|
| 6,292,901 B1 * | 9/2001 | Lys | H05B 47/18 | 713/300 |
| 7,135,664 B2 * | 11/2006 | Vornsand | H05B 45/22 | 250/205 |
| 8,083,381 B2 * | 12/2011 | Tsai | F21V 17/164 | 362/249.02 |
| 2002/0048169 A1 * | 4/2002 | Dowling | F21K 9/233 | 372/38.1 |
| 2011/0119975 A1 * | 5/2011 | Kuo | G09F 9/33 | 362/249.02 |
| 2016/0109083 A1 * | 4/2016 | Li | F21V 23/0407 | 362/277 |

(Continued)

*Primary Examiner* — Bryon T Gyllstrom
(74) *Attorney, Agent, or Firm* — KIP Legal Services

(57) ABSTRACT

A point light-source includes a housing and a light-emitting circuit packaged in the housing. The housing includes an upper housing and a lower housing, and the light-emitting circuit includes a constant-current control chip and a plurality of single-color light strings. Each single-color light string is composed of a plurality of light-emitting elements connected in series. The constant-current control chip is configured to, in response to an external serial signal, generate pulse signals transmitted to each single-color light string so as to change a luminous brightness of each single-color light string correspondingly through each of the pulse signals.

17 Claims, 11 Drawing Sheets

(56) References Cited

U.S. PATENT DOCUMENTS

| | | | | |
|---|---|---|---|---|
| 2016/0227616 | A1* | 8/2016 | Lee | H05B 47/105 |
| 2016/0278171 | A1* | 9/2016 | Jermyn | H05B 45/10 |
| 2016/0323972 | A1* | 11/2016 | Bora | H05B 47/11 |
| 2017/0231061 | A1* | 8/2017 | Deese | H05B 47/175 |
| 2022/0386435 | A1* | 12/2022 | Bessems | H05B 47/11 |

* cited by examiner

POINT LIGHT-SOURCE, LAMP, ASSEMBLY, AND SYSTEM

CROSS-REFERENCES TO RELATED APPLICATIONS

This application claims priority to Chinese Patent Application No. CN202221979646.5, filed on Jul. 28, 2022, and Chinese Patent Application No. CN202223297625.8, filed on Dec. 7, 2022, the content of all of which is hereby incorporated by reference in entirety.

FIELD OF THE TECHNOLOGY

The present disclosure relates to the field of lighting technologies and, more specifically, to a point light-source, a lamp, a point light-source assembly, and a point light-source system.

BACKGROUND OF THE DISCLOSURE

A point light-source is a new type of decorative light, which is a supplement to line light source and flood lighting, and is mainly used for lighting of buildings, bridge outlines, hotels, billboards, curtain walls, and night venues. In the traditional structures of point light sources, due to unreasonable structural designs, the internal structure and electronic components are easily affected by external factors, especially when the point light-sources are installed outdoors. After a long period of use, the external water vapor can easily enter the point light-source, and the water vapor may be condensed as water droplets on the inner wall of the point light-source, affecting the lighting effect of the point light-source, and even causing breakdown or failure of the internal electrical components of the point light-source.

Further, generally speaking, a light strip is composed of multiple LED light sources connected in series, so that the light strip has a certain length, which can loop around or wrap around the decorative object to improve the visual effect of the decorative object.

However, because the light strip generally has a long length, when in use, the head and tail of the light strip have a significant voltage drop, so that the operating voltage of the tail area of the LED light strip is lower than the operating voltage of the head end, resulting in a significant difference in brightness between the head and tail of the light strip, and reducing the overall luminous effect of the light strip.

In order to solve this problem, it is generally to supplement power at the tail area of the light strip to increase the voltage at the tail area of the light strip so that the brightness of each LED light in the light strip is consistent. However, such a method may greatly increase the complexity of the installation of the light strip and require additional power supply costs.

Alternatively, the input voltage to the light strip can be increased to solve the voltage drop problem. However, if the input voltage is increased, it is easy to burn out the LED light due to excessive voltage, so it is often necessary to install multiple LED lights at each node of the light strip to share the output voltage and avoid excessive voltage received by a single LED light. However, LED lights are generally installed in a light-transmitting box to improve the luminous effect of the LED light, and the volume of the light-transmitting box is generally small and can only accommodate one LED light. When placing multiple LED lights inside the light-transmitting box, the volume of the light-transmitting box will be greatly increased, and the aesthetics of the light-transmitting box will be reduced. Further, because multiple LED lights are squeezed into the same light-transmitting box, multiple LED lights cannot be arranged reasonably, resulting in that the light effect produced by the multiple LED lights is far less than the expected effect, which causes waste and increases the production cost.

The disclosed methods and apparatus are directed to solve one or more problems set forth above and other problems.

SUMMARY

According to one aspect of the present disclosure, a point light-source is provided. The point light-source includes a housing and a light-emitting circuit packaged in the housing. The housing includes an upper housing and a lower housing, and the light-emitting circuit includes a constant-current control chip and a plurality of single-color light strings. Each single-color light string is composed of a plurality of light-emitting elements connected in series. The constant-current control chip is configured to, in response to an external serial signal, generate pulse signals transmitted to each single-color light string so as to change a luminous brightness of each single-color light string correspondingly through each of the pulse signals.

According to another aspect of the present disclosure, a point light-source lamp is provided. The point light-source lamp includes a plurality of point light-sources and a dimming controller. The plurality of point light-sources are connected in series with wires, the dimming controller is electrically connected to the plurality of point light-sources, and the dimming controller is configured to send serial signals to the plurality of point light-sources to control light color, brightness, and/or frequency of each point light-source.

According to another aspect of the present disclosure, another point light-source is provided. The point light-source includes a housing, and a circuit board arranged in the housing. The circuit board is provided with a light-emitting circuit and a light-emitting unit electrically connected to the light-emitting circuit; the housing includes a cover and an inner shell covered with the cover; a convex lens is provided on the cover, the convex lens being integrally formed with the cover; and the light-emitting unit is arranged corresponding to the convex lens such that light emitted by the light-emitting unit is collected by the convex lens and transmitted to outside through the convex lens.

According to another aspect of the present disclosure, a point light-source assembly is provided. The point light-source assembly includes a plurality of point light-sources and a controller. The plurality of point light-sources are connected in series through wires, and the controller is electrically connected to the point light-source located at an end of the plurality of point light-sources, and is configured to control the plurality of point light-sources to emit light.

According to another aspect of the present disclosure, a point light-source system is provided. The point light-source system includes at least two light strips each containing a plurality of point light-sources, and a controller. The controller is configured to control the at least two light strips to emit light, the plurality of point light-sources in each light strip are connected in series through wires, a first end of each light strip is electrically connected to a first wiring terminal, and a second end of each light strip is electrically connected to a second wiring terminal, and the at least two light strips include a first light strip and a second light strip, the first wiring terminal is electrically connected to the controller, and the second wiring terminal of the first light strip is electrically connected to the first wiring terminal of the second light strip.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

Figure 1:
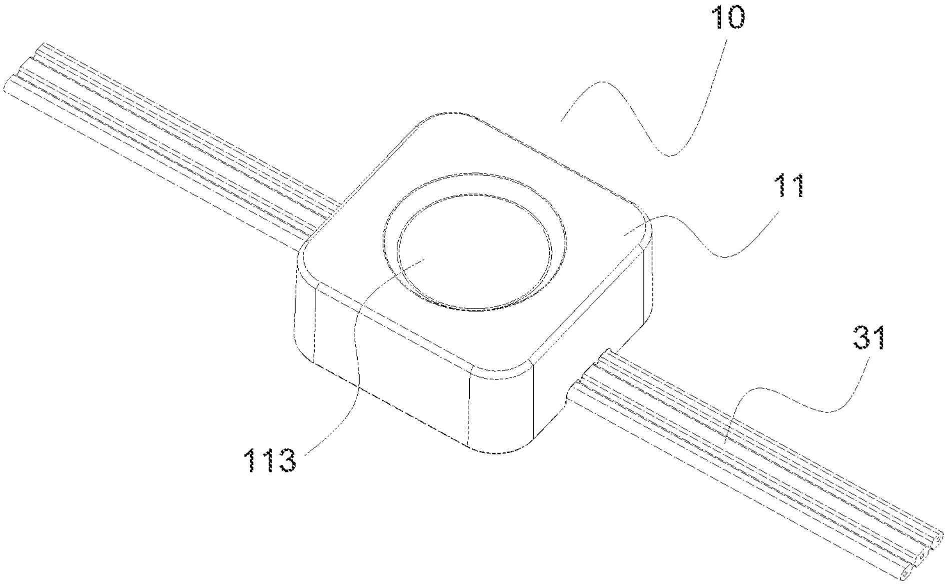
FIG. 1 illustrates a structural diagram of a point light-source according to embodiments of the present disclosure.

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms “a”, “an”, “said” and “the” used herein may also include plural forms. It should be further understood that the word “comprising” used in the description of the present disclosure refers to the presence of the stated features, integers, steps, operations, elements and/or components, but does not exclude the presence or addition of one or more other features, integers, steps, operations, elements and/or components or the combinations thereof. It will be understood that when an element is referred to as being “connected” or “coupled” to another element, it can be directly connected or coupled to the other element or intervening elements may also be present. Additionally, “connected” or “coupled” as used herein may include wireless connection or wireless coupling. The expression “and/or” used herein includes all or any elements and all combinations of one or more associated listed items.

Those skilled in the art can understand that unless otherwise defined, all terms (including technical terms and scientific terms) used herein have the same meanings as commonly understood by those of ordinary skill in the art to which the present disclosure belongs. It should also be understood that terms, such as those defined in commonly used dictionaries, should be understood to have meanings consistent with their meaning in the context of the prior art, and unless specifically defined as herein, are not intended to be idealized or have overly formal meaning.

The present disclosure provides a point light-source. The point light-source is provided with a constant-current control chip and a plurality of monochrome or single-color light strings, and the plurality of single-color light strings respectively emit light of different colors to form light of any color. That is to say, the combination of the plurality of single-color light strings is equivalent to an LED light, and the constant-current control chip can maintain a constant current of each single-color light string of the point light-source. A plurality of point light-sources are connected in series to form a point light-source lamp, and the voltage at the end area of the point light-source lamp is greater than the operating voltage of the point light-sources, so that the voltage at each part of the point light-source lamp is greater than the operating voltage of the point light-sources, so that the point light-source of the point light-source lamp can emit light of rated brightness.

Figure 2:
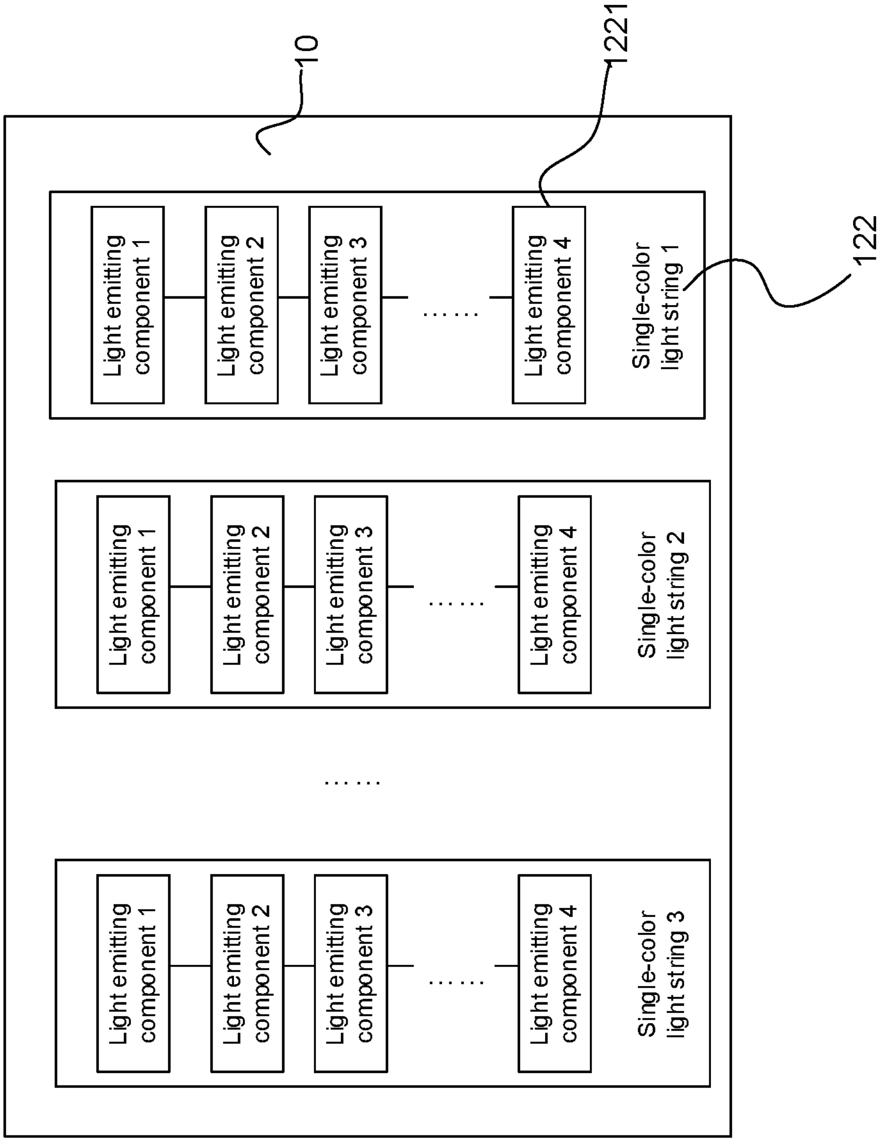
FIG. 2 illustrates a schematic diagram of a plurality of single-color light strings of point light-sources according to an embodiment of the present disclosure.
Figure 3:
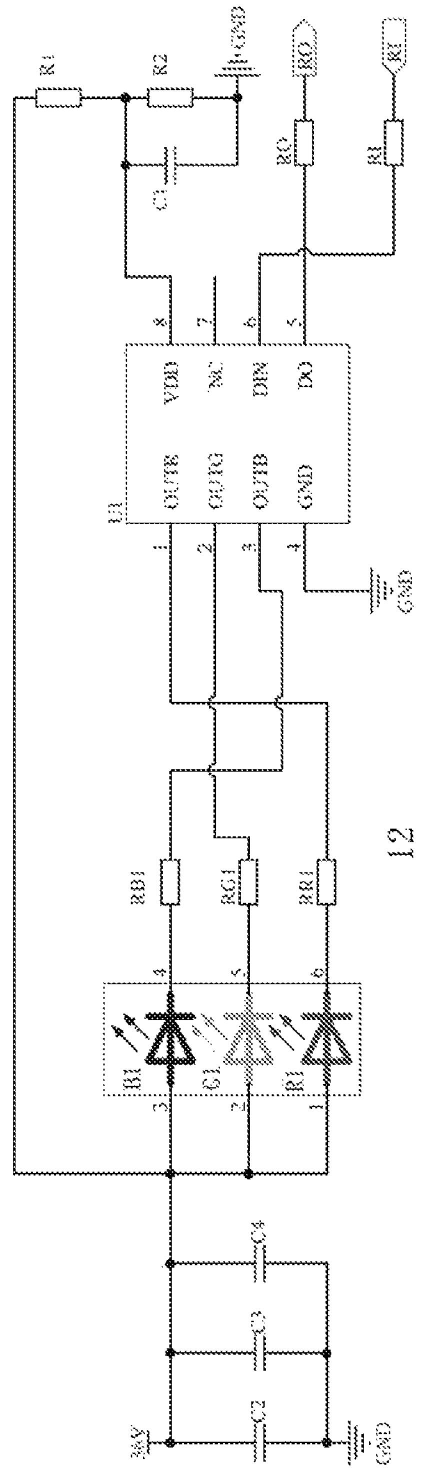
FIG. 3 illustrates a schematic circuit diagram of a lighting circuit of the point light-source according to an embodiment of the present disclosure.

According to an embodiment of the present disclosure, referring to FIG. 1 to FIG. 3, the point light-source 10 includes a housing 11 and a light emitting circuit 12 packaged in the housing 11. The light emitting circuit 12 includes a constant-current control chip U1, a plurality of single-color light strings 122, a plurality of current limiting resistors, and a filter circuit. The constant-current control chip U1 can maintain a constant current of the point light-source 10.

Referring to FIG. 2, each single-color light string 122 emits light of one color, and the plurality of single-color light strings 122 respectively emit light of different colors, so that the light emitted by each of the plurality of single-color light strings 122 can be composed to form light of any color.

Figure 4:
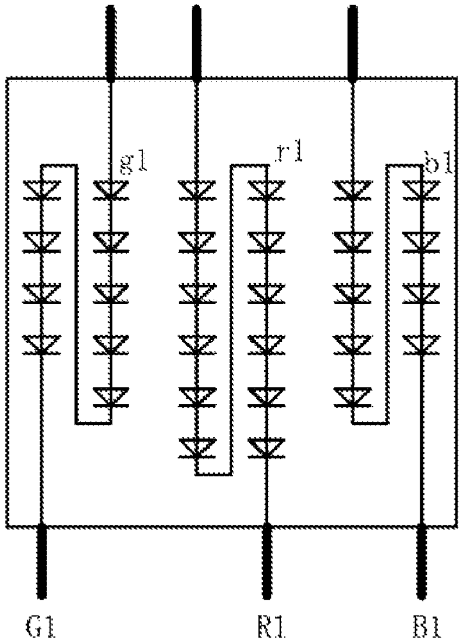
FIG. 4 illustrates a schematic circuit diagram of a red light string, a green light string, and a blue light string of point light-sources according to an embodiment of the present disclosure.

According to an embodiment of the present disclosure, referring to FIG. 3 and FIG. 4, the number of the single-color light strings 122 is three, and the three single-color light strings 122 are divided into the red light string R1, the green light string G1, and the blue light string B1. The red light string R1 emits red light, the green light string G1 emits green light, and the blue light string B1 emits blue light. The combination of the light emitted by the red light string R1, the light emitted by the green light string G1, and the light emitted by the blue light string B1 can form light of any color.

In one embodiment, the red light string R1, the green light string G1, and the blue light string B1 jointly form a light bead. In one embodiment, the light bead is an LED light bead.

Referring to FIG. 2, each of the single-color light string 122 is composed of multiple light-emitting components or elements 1221 connected in series. Specifically, the light-emitting elements 1221 are used to emit light to the outside. The multiple light-emitting elements 1221 in the same single-color light string 122 emit light of the same color. In one embodiment, the light emitting element 1221 is a light emitting chip. In one embodiment, the operating current of the light-emitting chips may be approximately 20 mA, and each single-color light string 122 may be configured with 8 to 12 light-emitting chips, and the forward operating voltage of the single-color light string 122 may be between 26-27V.

Traditional LED lamps generally have a single light-emitting element for each of the three colors of red, green, and blue. To increase the brightness of each color, it is necessary to apply a large current to the corresponding light-emitting element to increase the brightness, which also makes the traditional LED light generate excessive heat, and the excessive heat makes the light-emitting elements easily be burned out. However, according to the present disclosure, the single-color light string 122 is provided with a plurality of series-connected light-emitting elements 1221. The current needed for the single-color light string 122 is similar to that for the traditional LED light-emitting element, but the brightness of the multiple light emitting elements 1221 in the single-color light string 122 simultaneously emitting light can easily reach or exceed the brightness of the light emitting element of the traditional LED lamp.

In one embodiment, referring to FIG. 4, the red light string R1 is composed of 8 to 12 light emitting elements r1 connected in series, the green light string G1 is composed of 8-10 light emitting elements g1 connected in series, and the blue light string B1 is composed of 8-10 light emitting elements b1 connected in series. In one embodiment, the light emitting element is an LED.

Referring to FIG. 3, the constant-current control chip U1 is respectively connected to the red light string R1, the green light string G1, and the blue light string B1, and the constant-current control chip U1 is used to control the light brightness of the red light string R1, the green light string G1, and the blue light string B1, so as to control the light respectively emitted by the red light string R1, the green light string G1, and the blue light string B1 to be combined to form light of any desired color.

When the constant-current control chip U1 receives the serial signal sent by an external device, the constant-current control chip U1 obtains multiple control signals from the serial signal to obtain the corresponding control signals from the multiple control signals of the serial signal, and the corresponding control signals include light brightness parameters for the red light string R1, the green light string G1, and the blue light string B1. After obtaining the corresponding control signals, the constant-current control chip U1 controls the red light string R1, the green light string G1, and the blue light string B1 based on the corresponding control signals to emit light with the predetermined light-emitting brightness based on light brightness parameters.

Specifically, the corresponding control signals include a first pulse signal corresponding to the red light string R1, a second pulse signal corresponding to the green light string G1, and a third pulse signal corresponding to the blue light string B1. The constant-current control chip U1 outputs the first pulse signal to the red light string R1 to control the luminous brightness of the red light string R1; the constant-current control chip U1 outputs the second pulse signal to the green light string G1 to control the green light the luminous brightness of the string G1; the constant-current control chip U1 outputs the third pulse signal to the blue light string B1 to control the luminous brightness of the blue light string B1. Thus, the constant-current control chip U1 controls the brightness of the light emitted by the red light string R1, green light string G1, and the blue light string B1, and controls the color of the light formed by combining the light emitted by the three light strings.

Figure 5:
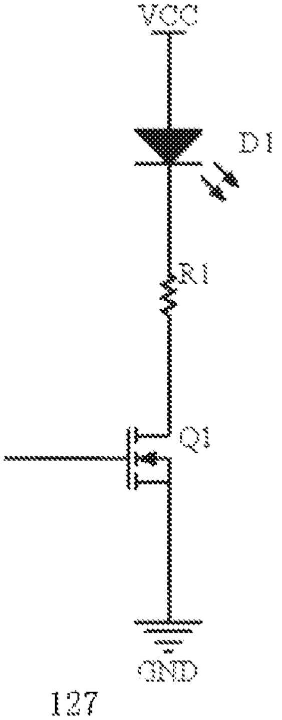
FIG. 5 illustrates a schematic circuit diagram of a signal modulation circuit of a point light-source according to an embodiment of the present disclosure.
Figure 6:
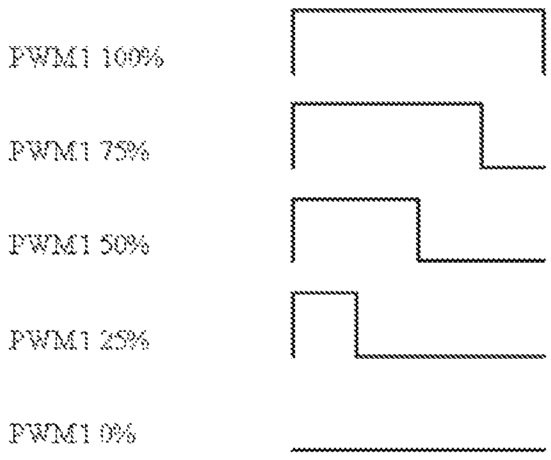
FIG. 6 illustrates a schematic waveform diagram of a pulse signal according to an embodiment of the present disclosure.

Referring to FIG. 5, the constant-current control chip U1 is provided with a signal modulation circuit 127. The signal modulation circuit 127 may be provided with a MOS (metal-oxide-semiconductor) transistor Q1, and the constant-current control chip U1 controls the turn-on and cut-off of the gate of the MOS transistor Q1 of the signal modulation circuit 127, thereby controlling the current changes of the three light strings, and controlling the luminous brightness of the three light strings. Specifically, by changing the duty cycle of the pulse signals, the current change for the single-color light string 122 can be controlled. The duty cycle may be referred as, in one cycle, the ratio of the time of high voltage level conduction with respect to the time of the whole cycle. The duty cycle of the pulse signal is correlated with the current change of the single-color light string 122, and the current change is correlated with the luminous brightness, thereby controlling the luminous brightness of the single-color light string 122 by controlling the duty cycle of the pulse signal. For example, referring to FIG. 6, each PWM (pulse width modulation) signal in FIG. 6 represents a pulse signal. When the duty cycle of the pulse signal is 100%, the brightness of the single-color light string 122 is 100%; when the duty cycle of the pulse signal is 75%, the brightness of the single-color light string 122 is 75%; when the duty cycle of the pulse signal is 50%, the brightness of the single-color light string 122 is 50%; when the duty cycle of the pulse signal is 25%, the brightness of the single-color light string 122 is 25%; when the duty cycle of the pulse signal is 0%, the single-color light string 122 is in the off state.

The brightness of the single-color light string 122 is correlated to the current required by the single-color light string 122, e.g., the higher the brightness, the greater the current required. The constant-current control chip U1 controls the current of each single-color light string 122 based on the pulse signals in the control signal, thereby controlling the brightness of the entire point light-source 10.

In one embodiment, the constant-current control chip U1 is provided with one signal modulation circuit 127 for each of the red light string R1, the green light string G1, and the blue light string B1, so as to control the red light string R1, the green light string G1, and the blue light string B1 simultaneously to emit light.

Specifically, referring to FIG. 3, the constant-current control chip U1 is provided with multiple pins, the red light string R1 is connected to the pin OUTR of the constant-current control chip U1, the green light string G1 is connected to the pin OUTG of the constant-current control chip U1, and the blue light string B1 is connected to the pin OUTB of the constant-current control chip U1.

The constant-current control chip U1 is also provided with pin VDD, pin DIN, and pin DO. The pin VDD is connected to the power supply; the pin DIN is connected to the signal input line to receive the serial signal inputted by the external device; the pin DO is connected with the signal output line, and is used to output the serial signal to the next point light-source 10 or other device.

According to an embodiment of the present disclosure, a current limiting resistor is connected in series between the constant-current control chip U1 and the connected single-color light string 122, and the current limiting resistor is used to limit the current flowing through the single-color light string 122, so as to prevent the current flowing through the single-color light string 122 from being too large and damaging the light-emitting elements 1221 in the single-color light string 122. Moreover, the current limiting resistor can also divide and stabilize the voltage of the single-color light string 122. Specifically, referring to FIG. 3, a first current limiting resistor RR1 is connected in series between the constant-current control chip U1 and the red light string R1; a second current limiting resistor RG1 is connected in series between the constant-current control chip U1 and the green light string G1, and a third current limiting resistor RB1 is connected in series between the constant-current control chip U1 and the blue light string B1.

The light-emitting circuit 12 is also provided with a filter circuit, and the filter circuit is connected with the red light string R1, the green light string G1 and the blue light string B1. The filter circuit is also connected with the power supply and the ground. The filter circuit is used to filter out the noise in the light emitting circuit 12. According to an embodiment of the present disclosure, referring to FIG. 3, the filter circuit is composed of three capacitors connected in parallel, a first capacitor C2, a second capacitor C3, and a third capacitor C4.

Figure 7:
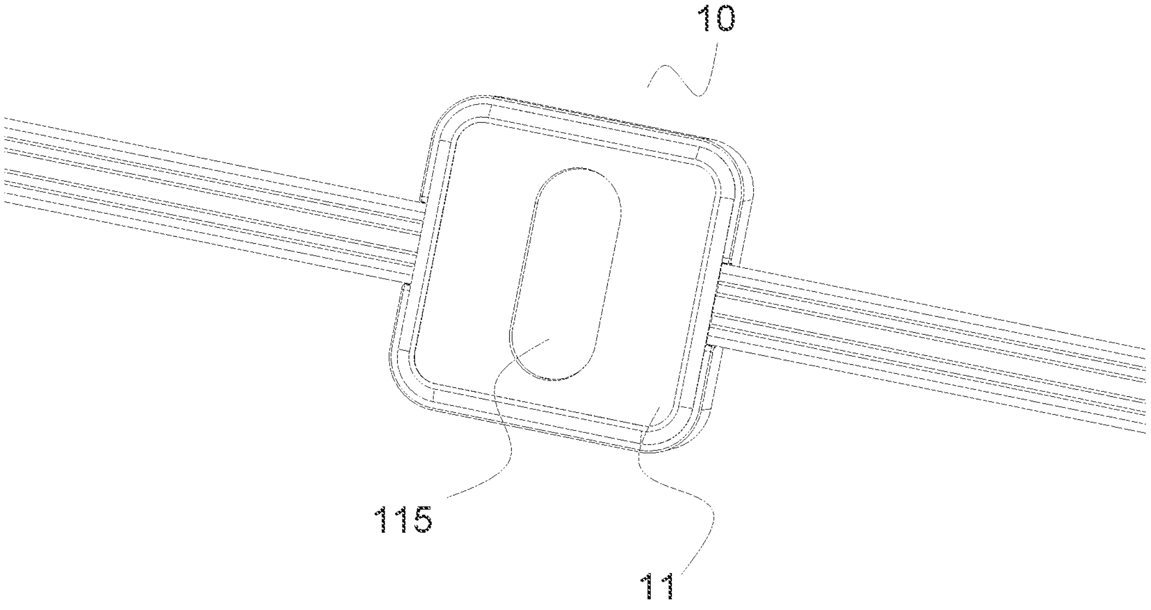
FIG. 7 illustrates a top view of a point light-source according to an embodiment of the present disclosure.
Figure 8:
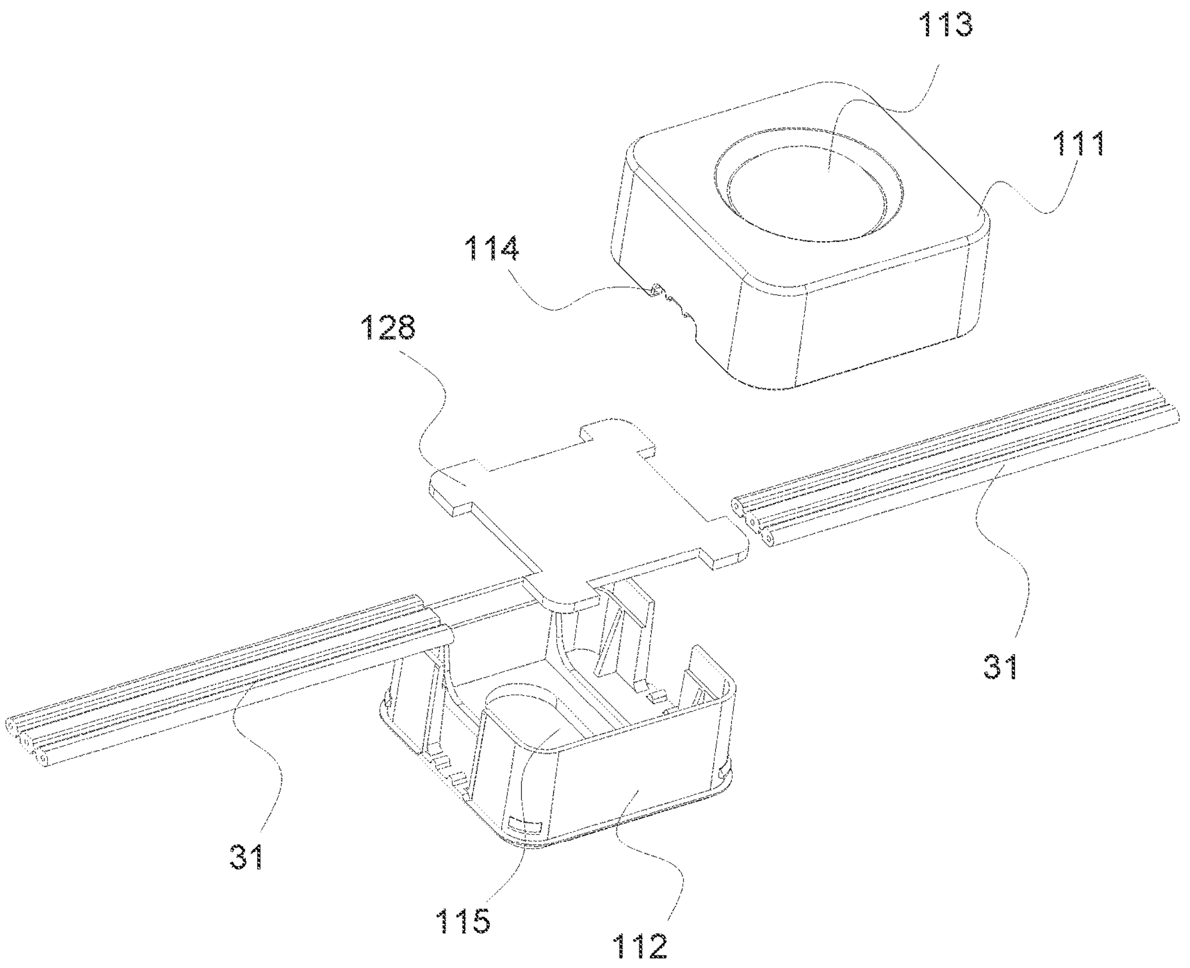
FIG. 8 illustrates an explosive view of a point light-source according to an embodiment of the present disclosure.
Figure 9:
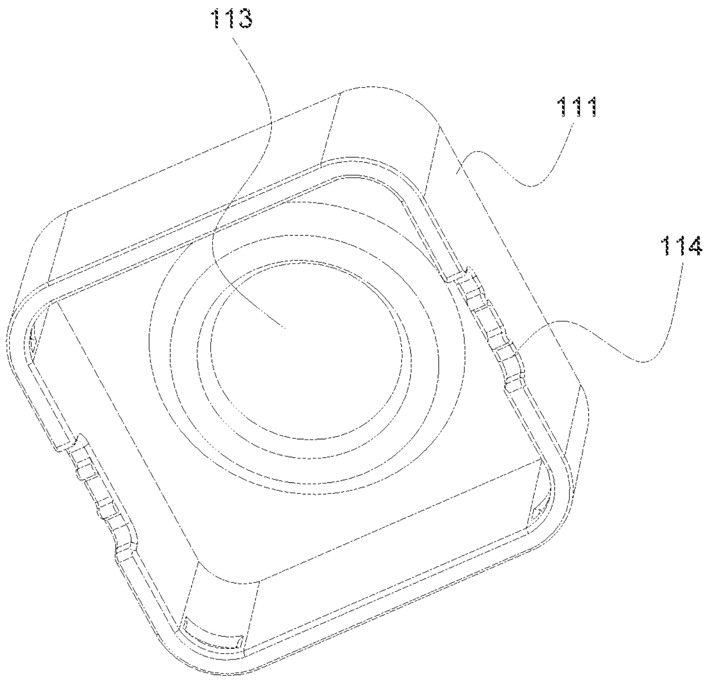
FIG. 9 illustrates a schematic diagram of an upper housing of a point light-source according to an embodiment of the present disclosure.

Referring to FIG. 7 to FIG. 9, the housing 11 includes an upper housing 111 and a lower housing 112 that match with each other. The light emitting circuit 12 is disposed on a circuit board 128 disposed in the housing 11. The upper housing 111 is provided with a convex lens 113, and the single-color light string 122 is arranged on the first surface of the circuit board 128, and the first surface of the circuit board 128 faces the convex lens 113, so that the convex lens 113 can enlarge brightness of the single-color light string 122. Specifically, the red light string R1, the green light string G1, and the blue light string B1 are arranged on the first surface of the circuit board 128, so that the light of any color formed by combining the light emitted by the three light strings combined can be transmitted through the convex lens 113 to the outside. The convex lens 113 may be a transmissive lens or a reflective lens.

In one embodiment, the red light string R1, the green light string G1, and the blue light string B1 form a light bead, and the light bead is arranged facing the convex lens 113 or the light bead is embedded in the convex surface of the convex lens 113 such that the light emitted by the light bead is enlarged by the convex lens 113 and transmitted to the outside.

Referring to FIG. 8, the housing 11 is also provided with a wiring slot 114, the wiring slot 114 is used to accommodate the external cable or connection wire 31, so that the external connection wire 31 extends into the housing 11 and connects with the light emitting circuit 12 on the circuit board 128. In one embodiment, two wiring slots 114 are provided on the housing 11, and the two wiring slots 114 are arranged symmetrically, so that the point light-source 10 can be connected to two external connection wires 31, and the point light-source 10 can be connected with other point light-sources and/or other external devices.

Referring to FIG. 8 and FIG. 9, the housing 11 is also provided with a glue filling groove 115, and the glue filling groove 115 is used to pour waterproof glue into the housing 11, so as to form a waterproof sealing shell in the housing 11. In one embodiment, the glue filling groove 115 is arranged in the lower housing 112.

The volume of the housing 11 may be between 0.1-15 $cm^3$, so that the volume of the point light-source 10 is relatively small and does not take up too much space, thus it is convenient for the point light-source 10 to be connected in series with other point light-sources 10 to form a light strip. In one embodiment, the area of the first surface of the circuit board 128 may be between 20-30 $mm^2$, and the area of the surface facing or facing away from the first surface of the housing 11 corresponds to the area of the first surface, so that the housing 11 can be miniaturized, resulting in miniaturization of the point light-source 10.

In one embodiment, the point light-source 10 adopts a DC power supply. In one embodiment, the operating voltage of the DC power supply is 36V.

Figure 10:
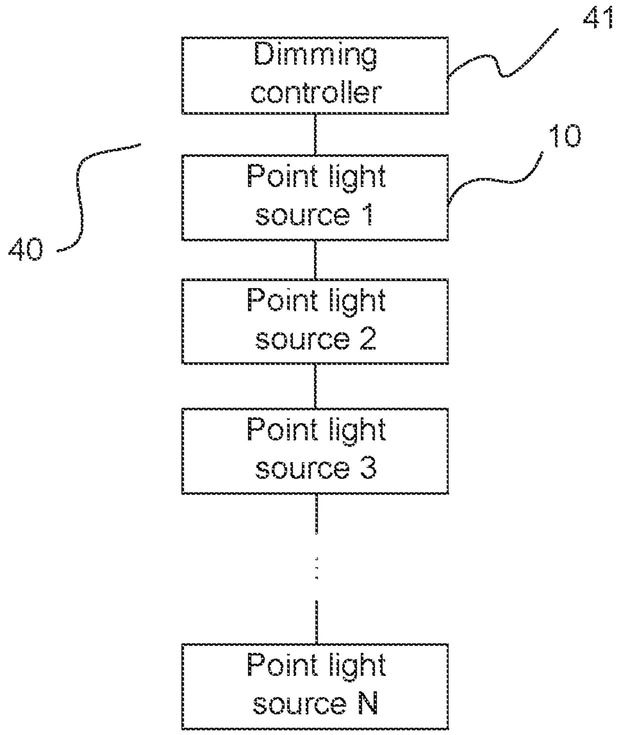
FIG. 10 illustrates a schematic diagram of a point light-source lamp according to an embodiment of the present disclosure.

The present disclosure also provides a point light-source lamp 40. Referring to FIG. 10, the point light-source lamp 40 includes a dimming controller 41 and a plurality of point light-sources 10, and the point light-sources 10 are the point light-sources 10 described above. The plurality of point light-sources 10 are connected in series through connecting wires 31 to form a string of light sources, and the string of light sources is in a linear or strip-like structure. In one embodiment, a total number of 2 to 30 point light-sources 10 are arranged in the light source string. In one embodiment, the length of the connection line 31 connecting two adjacent point light-sources 10 in the light source strip may be between 10-100 cm.

Further, the dimming controller 41 is also connected in series with the light source strip, and the dimming controller 41 controls the color and/or brightness and/or frequency of the light emitted by each point light-source 10 in the light source strip by outputting a serial signal to the light source strip. Specifically, the serial signal includes a plurality of sequentially arranged control signals, and each control signal corresponds to a point light-source 10. After each point light-source 10 obtains a corresponding control signal from the serial signal, the serial signal is outputted to the next point light-source 10.

The constant-current control chip U1 is used to keep constant the current of the point light-source 10 where it is located, so that the current flowing through each point light-source 10 is consistent, so that there is no large difference in the luminous brightness of each point light-source 10.

Accordingly, the point light-source of the present disclosure controls the luminous brightness of each single-color light string through the output pulse signal of the constant-current control chip, so that the light emitted by the multiple single-color light strings forms light of any color, and the constant-current control chip can also control the current flowing through the point light-source to make the current constant, so that there will be no large difference in the luminous brightness of each point light-source of the point light-source lamp.

Specifically, the constant current control chip of the point light source of the present invention can control the current flowing through each single-color light string by responding to the control signal in the external serial signal, so that the current flowing through the point light source is maintained within a certain range, avoiding the situation where the current flowing through the single-color light string is too large, and the single-color light string is burned out.

Further, each single-color light string of the point light source emits different colors respectively, and the constant current control chip controls the luminous brightness of the plurality of single-color light strings by responding to the control signal, so that each single-color light string emits light of different brightness, and the light emitted by the plurality of single-color light strings can be combined to form light of any color.

Further, the point light-source includes multiple single-color light strings, and the multiple single-color light strings can be packaged in the same light bead, so that the point light-source can be miniaturized. There is no need to arrange a plurality of light beads in the housing, like the traditional point light-source, which makes the traditional lamp have a larger volume and causes the light emitted by the plurality of light beads affecting each other and resulting in poor light effect.

In addition, the point light-source lamp is composed of a plurality of point light-sources connected in series, each point light-source controls the current flowing through the included constant current control chip, so that the current flowing through each point light-source of the point light-source lamp can be the same, which further solves the problem of current inconsistency caused by the voltage difference between the first and last point light-sources among the multiple point light-sources connected in series, so that the brightness of each point light-source of the point light-source lamps remains consistent, and there is no need to compensate current for certain point light-sources, saving costs.

The present disclosure also provides another point light-source. In the point light-source, the convex lens arranged on the cover is closed by a circuit board to form a closed light-emitting space. The light-emitting unit on the circuit board is correspondingly arranged in the light-emitting space, and glue is poured into the cover and the inner shell to form a sealed space, such that the point light-source can be waterproofed, and the glue will not enter the light-emitting space, so as not to affect the light-emitting effect of the light-emitting unit, realizing both light-emitting and waterproof for the point light-source.

Figure 11:
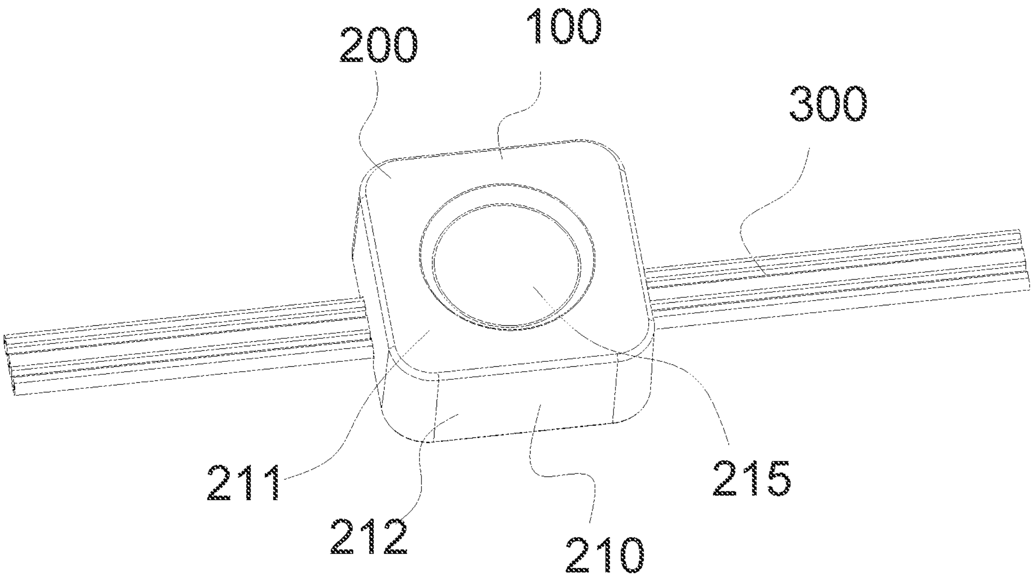
FIG. 11 illustrates a schematic diagram of another point light-source according to an embodiment of the present disclosure.
Figure 12:
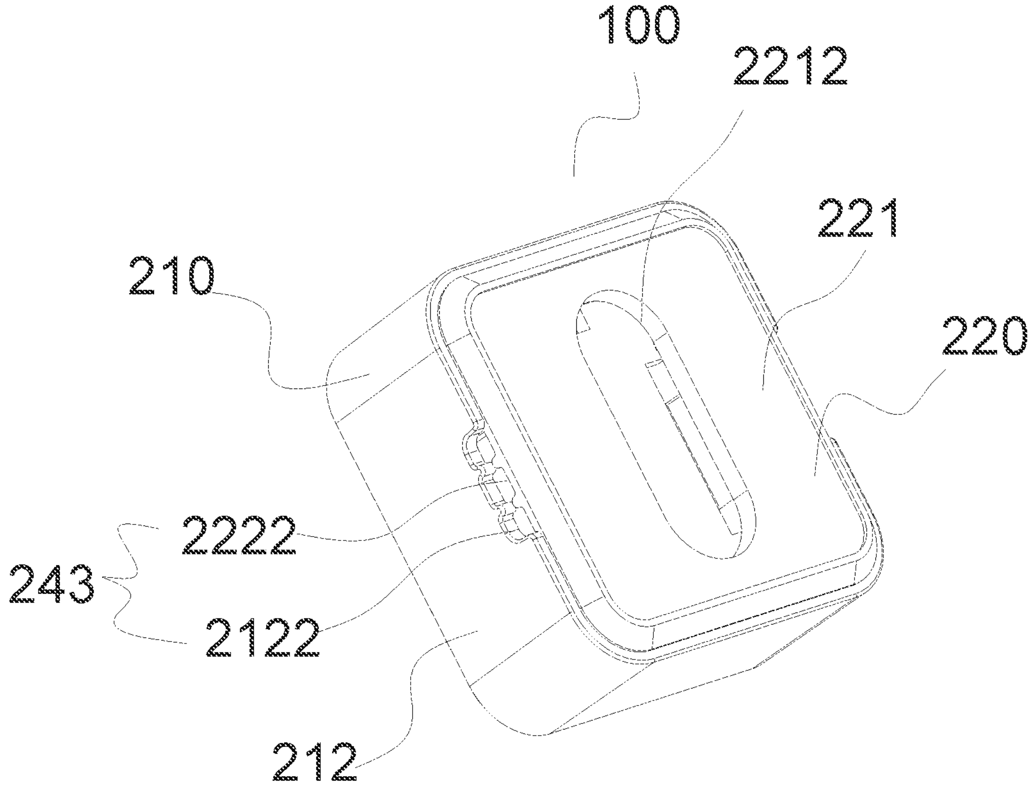
FIG. 12 illustrates a three-dimensional schematic diagram of another point light-source according to an embodiment of the present disclosure.
Figure 13:
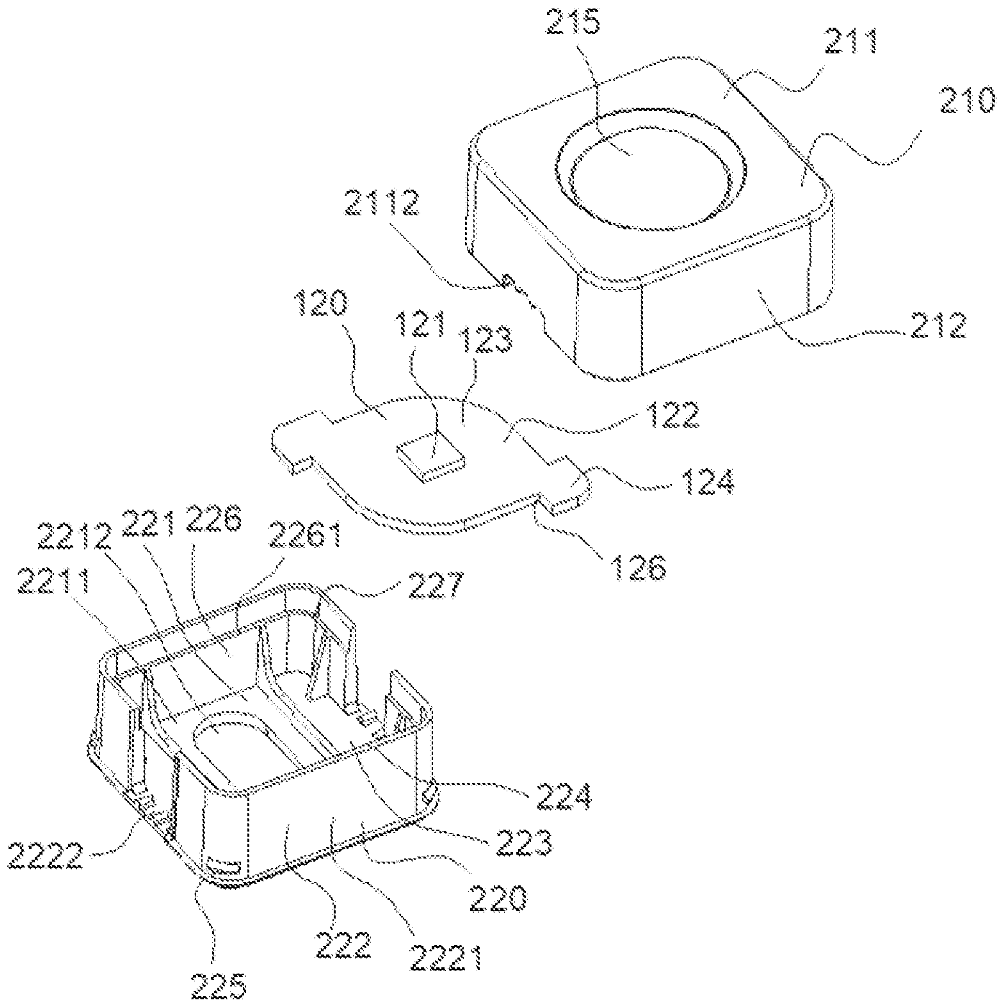
FIG. 13 illustrates a schematic diagram of an explosive view of another point light-source according to an embodiment of the present disclosure.

According to an embodiment of the present disclosure, referring to FIGS. 11 to 13, the point light-source 100 includes a housing 200 and a circuit board 120 disposed in the housing 200. The circuit board 120 is provided with a light-emitting circuit and a light-emitting unit 121, the light-emitting circuit is electrically connected to the light-emitting unit 121, and the light-emitting circuit is electrically connected to an external circuit through an external cable 300. The light-emitting unit 121 is driven by the light emitting circuit to emit light, so that the point light-source 100 emits light to the outside.

Figure 14:
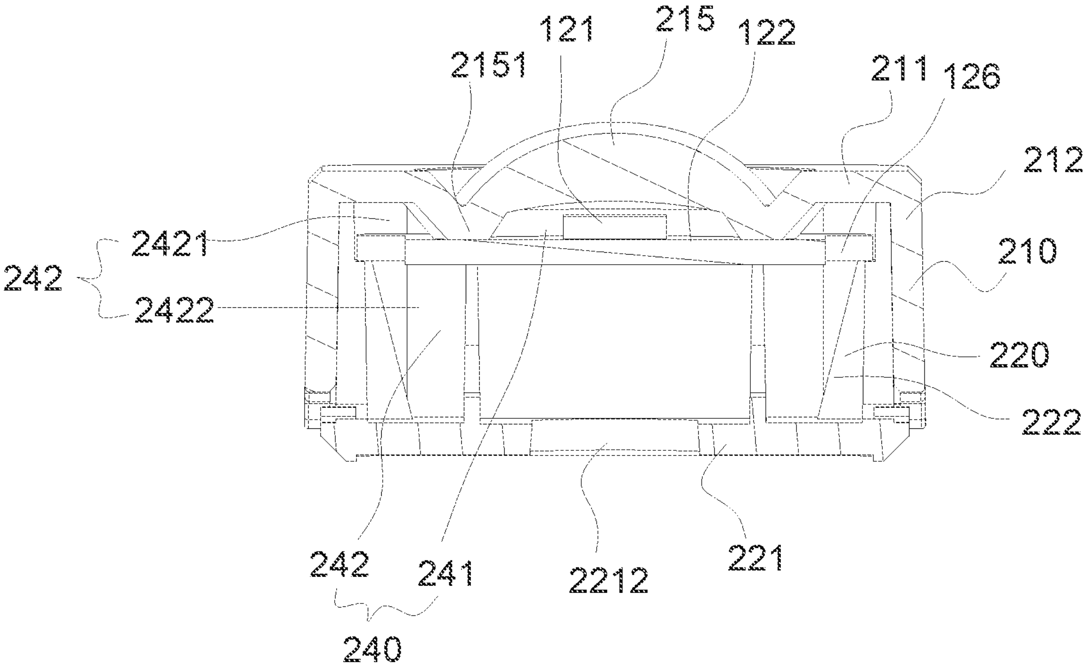
FIG. 14 illustrates a schematic diagram of a cross-sectional view of another point light-source according to an embodiment of the present disclosure.

Referring to FIG. 13 and FIG. 14, the housing 200 includes a cover 210 (i.e., upper housing) and an inner shell 220 (i.e., lower housing), and the cover 210 covers the inner shell 220 to form a housing space 240 for accommodating the above circuit board 120.

Figure 15:
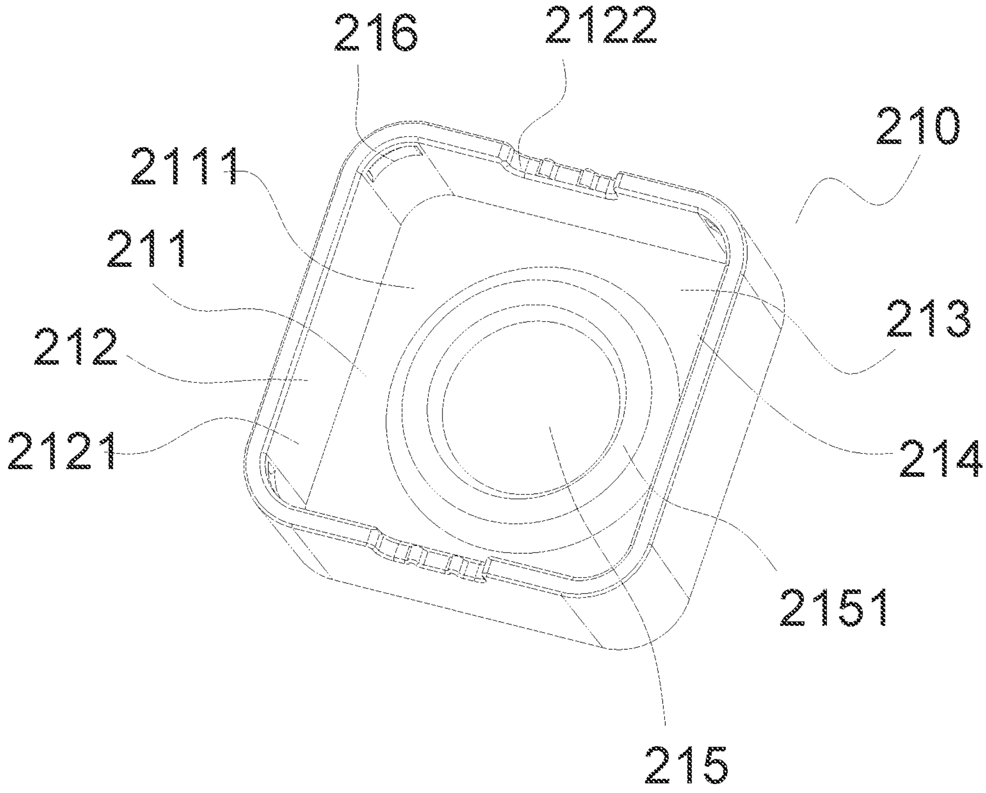
FIG. 15 illustrates a schematic diagram of a cover of another point light-source according to an embodiment of the present disclosure.

Specifically, referring to FIG. 13 and FIG. 15, the cover 210 includes a top wall 211 and a plurality of outer sidewalls 212, and the plurality of outer sidewalls 212 are arranged along the edge of the top wall 211, so that the top wall 211 and the plurality of outer sidewalls 212 enclose to form a semi-surrounding structure, i.e., the cover 210. The cover 210 is provided with a first accommodating space 213, the first accommodating space 213 is in the shape of an open groove, and the first accommodating space is provided with a first opening 214.

The top wall 211 is provided with a convex lens 215, and the convex lens 215 is integrally formed with the top wall 211. That is, the convex lens 215 is integrally formed with the cover 210. By integrally forming the cover 210 and the convex lens 215, on the other hand, also makes it easy and convenient to install the point light-source 100, thereby avoiding the process of fitting the convex lens 215 and the cover 210, and effectively improving production efficiency. Further, by integrally forming the cover 210 and the convex lens 215, superior waterproof performance can be achieved, improving the waterproof capability of the point light-source 100.

Referring to FIG. 15, the peripheral edge 2151 of the convex lens 215 is recessed from the outer side of the top wall 211 toward the first opening 214, so that the peripheral edge 2151 of the convex lens 215 protrudes toward the first opening 214 relative to the inner side 2111 of the top wall 211. The convex lens 215 may have a transparent structure.

Referring to FIG. 13, the inner shell 220 includes a bottom wall 221 and a plurality of inner sidewalls 222, and the plurality of inner sidewalls 222 are arranged along the edge of the bottom wall 221, so that the bottom wall 221 and the plurality of inner sidewalls 222 enclose to form a semi-enclosed structure, i.e., the inner shell 220. The inner shell 220 is provided with a second accommodating space 223, the second accommodating space 223 is in the shape of an open groove, and the second accommodating space 223 is provided with a second opening 224.

Referring to FIG. 13 and FIG. 14, the shape of the first accommodating space of the cover 210 corresponds to the shape of the inner shell 220, and the volume of the first accommodating space is larger than the volume of the inner shell 220. The inner shell 220 can be inserted into the first accommodating space through the first opening 214 of the first accommodating space, that is, the cover 210 covers the inner shell 220.

Specifically, the cover 210 covers the inner shell 220 to form a complete housing 200. The orientation of the first opening 214 of the cover 210 is opposite to the orientation of the second opening 224 of the inner shell 220, and the inner surface 2111 of the top wall 211 of the cover 210 is disposed opposite to the inner surface 2211 of the bottom wall 221. The top wall 211 of the cover 210 constitutes the top wall of the housing 200, the outer wall 212 of the cover 210 constitutes the outer wall of the housing 200, and the bottom wall 221 of the inner shell 220 constitutes the bottom wall of the housing 200. The first accommodating space 213 of the cover 210 cooperates with the second accommodating space 223 of the inner shell 220 to form a housing space 240 of the housing 200.

Referring to FIG. 15, the inner surface 2121 of the cover 210 is provided with a matching part, the outer surface 2221 of the inner shell 220 is provided with a snap-fit part, and the snap-fit part is snapped in or buckled and connected with the matching part, so that there is a stable connection between the cover 210 and the inner shell 220.

Specifically, the matching part includes a snap-fit groove 216 provided on the inner surface 2121 of the outer sidewall 212 of the cover 210. Referring to FIG. 13, the snap-fit part include a snap-fit protrusion 225 on the outer surface 2221 of inner surface 222 of the inner shell 220, and the snap-fit protrusion is correspondingly snap-fit into the snap-fit groove 216 so that the cover 210 and the inner shell 220 are fixed together. In one embodiment, the multiple outer walls 212 of the cover 210 are each provided with a snap-fit groove 216, and the multiple inner walls 222 of the inner shell 220 are provided with multiple snap-fit protrusions corresponding to the multiple snap-fit grooves 216. The multiple snap-fit protrusion 225 correspondingly snap-fit the multiple snap-fit grooves, so that the inner shell 220 and the cover 210 can be buckled or snap-fit together and fixed stably.

In another embodiment, the matching part includes a snap-fit protrusion disposed on the inner surface 2121 of the outer sidewall 212 of the cover 210, and the snap-fit part includes a snap-fit groove disposed on the outer surface 2221 of the inner sidewall 222 of the inner shell 220. The snap-fit protrusion can snap-fit the snap-fit groove, such that the inner shell 220 and the cover 210 can be stably fastened and fixed together. Any number of matching snap-fit protrusions and snap-fit grooves may be used.

According to an embodiment of the present disclosure, referring to FIG. 13, at least one pair of support walls 226 are provided in the second accommodation space 223 of the inner shell 220, and the support walls 226 extend from the bottom wall 221 of the inner shell 220 to the second openings 224. When the cover 210 covers the inner shell 220, the support wall 226 enters into the first accommodating space 213 of the cover 210, and the distance between the top end 2261 of the support wall 226 and the peripheral edge 2151 of the convex lens 215 is equal to the thickness of the circuit board 120. The top ends 2261 of the pair of supporting walls 226 form the installation position 227 of the circuit board 120.

Referring to FIG. 14, the two ends of the circuit board 120 are arranged on the installation position 227, so that the circuit board 120 abuts against the peripheral edge 2151 of the convex lens 215, and the circuit board 120 covers the convex lens 215, so that a closed light-emitting space 241 is formed between the first surface 122 of the circuit board 120 and the convex lens 215. The light-emitting unit 121 is arranged on the first surface 122 of the circuit board 120, and the light-emitting unit 121 is correspondingly arranged inside the light-emitting space 241, so that the light emitted by the light-emitting unit 121 can be concentrated by the convex lens 215, so as to enhance the brightness of the light emitted through the convex lens 215. In one embodiment, the light-emitting unit 121 is a light bead, and the light bead is disposed in the light emitting space 241.

By arranging the circuit board 120 on the installation position 227, a light-emitting space 241 is formed in the housing space 240 of the housing 200, and the space of the housing space 240 except the light-emitting space 241 is called a sealed space 242. That is, the housing space 240 is divided by the circuit board 120 into a light-emitting space 241 and a sealed space 242, and the light-emitting space 241 and the sealed space 242 are not interconnected with each other, as being separated by the circuit board 120.

Referring to FIG. 12, the bottom wall 221 of the inner shell 220 is provided with a glue filling port 2212, and the glue filling port 2212 is a through groove, through which glue can be poured into the sealed space 242. The sealed space 242 is filled with the glue and, after the glue solidifies, a colloid filling the sealed space 242 is formed. Because a closed light-emitting space 241 is formed between the circuit board 120 and the convex lens 215, and the glue cannot flow into the light-emitting space 241, so that the glue will not wrap the light-emitting unit 121, and the light emitted by the light-emitting unit 121 will not be affected by the glue. In one embodiment, the glue is waterproof glue, so as to improve the waterproof performance of the point light-source 100.

In one embodiment, the glue filling port 2212 can extend along a preset direction, so that the device for injecting glue can reciprocatively move in the glue filling port 2212. The preset direction can be the length direction of the bottom wall 221, the width direction of the bottom wall 221, the direction with a certain angle with the length or width direction of the bottom wall 221, or the arc direction of a specific radius (that is, the cross-section of the glue filling port 2212 is arc-shaped). In this way, along with the reciprocating movement of the equipment for injecting the glue, the area corresponding to the movement track of the equipment in the sealed space 242 will be covered with glue first, and the glue will gradually flow to other areas. Compared with other methods in which the equipment for injecting glue is fixed relative to the glue filling port, this approach can effectively speed up the efficiency of glue covering and filling the entire sealed space 242. At the same time, the glue filling port 2212 is designed to extend in a predetermined direction, so that the opening area of the glue filling port 2212 is relatively large, thereby increasing the contact area between the glue in the sealed space 242 and the outside air, which can effectively shorten the curing time of the glue to form the colloid, improving production efficiency.

In one embodiment, the glue filling port 2212 can be a waist-shaped hole, and the equipment for injecting glue can be a glue dispenser. The waist-shaped hole swings back and forth, thereby increasing the flow speed of the glue in the sealed space 242 and speeding up the time for the glue to fill the sealed space 242, improving production efficiency.

The colloid wraps the circuit board 120 to make the circuit board 120 waterproof, so that the point light-source 100 can avoid water vapor erosion, enriching the use scenarios of the point light-source 100, and improving the service life of the point light-source 100. Further, the colloid also bonds together the circuit board 120, the inner shell 220, and the cover 210, so that the circuit board 120, the inner shell 220, and the cover 210 can be connected stably, and the structural stability of the point light-source 100 is improved. In addition, the colloid can also be used as a buffer structure. When the point light-source 100 is impacted by an external force, the colloid can buffer the external force and prevent the structure of the point light-source 100 from being damaged.

In one embodiment, referring to FIG. 13, the inner shell 220 is provided with a plurality of support walls 226, the number of the support walls 226 corresponds to the number of the inner sidewalls 222, and the support walls 226 and the inner sidewalls 222 are arranged in parallel. The top ends 2261 of the plurality of support walls together form a ring-shaped mounting position 227 for supporting circuit boards 120 of different shapes. In one embodiment, the supporting walls 226 are integrally formed with the corresponding inner sidewall 222 to reduce production difficulty.

Referring to FIG. 14 and FIG. 15, because the peripheral edge 2151 of the convex lens 215 protrudes toward the first opening 214 of the cover 210, the peripheral edge 2151 of the convex lens 215 is no longer on the same plane as the inner surface 2111 of the top wall 211 of the cover 210, the peripheral edge 2151 of the convex lens 215 is closer to the first opening 214 than the inner surface 2111 of the top wall 211. When the circuit board 120 is arranged on the ring-shaped mounting position 227 formed by the tops 2261 of the plurality of supporting walls 226, the circuit board 120 not only closes or covers the convex lens 215 to form the light-emitting space 241, but also form another closed space between the circuit board 120 and the inner surfaces 2111 of the top wall 211. This closed space is also called a partition space 2421, and the partition space 2421 is a part of the sealed space 242.

Referring to FIG. 13, the circuit board 120 includes a bearing portion 123 and at least two mounting portions 124. The bearing portion 123 is used to seal the convex lens 215 to form the light emitting space 241. The area of the projection of the convex lens 215 on the first surface 122 of the circuit board 120 (called the first projection) is S, the area of the projection of the top wall 211 of the cover 210 on the first surface of the circuit board 120 (called the second projection) is Q, and the area of the bearing portion 123 is Z, and $S \leqslant Z \leqslant Q$. That is, the area of the bearing portion 123 is greater than or equal to the area of the first projection, and the area of the bearing portion 123 is smaller than or equal to the area of the second projection, so that the bearing portion 123 can completely seal the convex lens.

In another embodiment, it may be provided that $S \leqslant Z \leqslant 0.65Q$. That is, the area of the bearing portion 123 is greater than or equal to the area of the first projection, and the area of the bearing portion 123 is less than or equal to 65% of the area of the second projection. Thus, in addition to the bearing portion 123, the mounting portions 124 of the circuit board 120 have sufficient areas, so that the circuit board 120 can be mounted on the mounting position 227 through at least two mounting portions 124.

The mounting portion 124 protrudes relative to the bearing portion 123, and the two mounting portions 124 are respectively disposed on both sides of the bearing portion 123, and the two mounting portions 124 are respectively disposed at different positions of the mounting position 227 to support the circuit board 120, such that the bearing portion 123 can seal the convex lens 215 stably. In one embodiment, the mounting portion 124 is in an approximately triangular shape, and the bearing portion 123 is in an approximately elliptical shape, so that the circuit board 120 has an irregular shape.

Because the mounting portion 124 is relatively protruded from the bearing portion 123, a glue leakage groove 126 is formed between the mounting portion 124 and the bearing portion 123. By providing the glue leakage groove 126 on the circuit board 120, the partition space 2421 is connected with the main body 2422 of the sealed space 242. Via the glue leakage groove 126, the glue in the main body 2422 of the sealed space 242 can flow into the partition space 2421 through the glue leakage groove 126, and bond the circuit board 120, the cover 210, and the inner shell 220, so that the circuit board 120, the cover 210, and the inner shell 220 can be in stable adhesive connection. The rate of injecting glue into the sealed space 242 can be controlled by the size of the glue leakage groove 126. In one embodiment, the glue leakage groove 126 is a notch structure formed by the mounting portion 124 protruding relative to the bearing portion 123. Alternatively, the glue leakage groove 126 is a hole-like structure.

Referring to FIG. 14, through the glue filling port 2212 of the bottom wall 221 of the inner shell 220, glue is poured into the main body 2422 of the sealed space 242, and flows into the partition space 2421 through the glue leakage groove 126 on the circuit board 120, so that the partition space 2421 is also filled with glue. After the glue in the partition space 2421 is solidified, a colloid is formed in the partition space 2421, and the colloid can bond the first surface 122 of the circuit board 120 and the inner surface 2111 of the top wall 211 of the cover 210. Thus, the circuit board 120 and the cover 210 are bonded and connected together to improve the structural stability of the point light-source 100.

In one embodiment, the inner surface of the cover 210 is provided with a textured structure, and the inner surface of the cover 210 includes the inner surface 211 of the top wall 211, and the inner surface 2121 of the outer wall 212. That is, the inner surface 211 of the top wall 211 of the cover 210 and the inner surface 2121 of the outer wall 212 can be provided with a textured structure. The textured structure is convenient for glue bonding, and avoids delamination when the cover 210 is combined with the glue. After the glue solidifies to form a colloid, the colloid can be fixedly bonded to the textured structure, so that the circuit board 120 and the cover 210 can be set relatively fixedly.

Specifically, after the glue enters the partition space 2421 through the glue leakage groove 126, the glue is in contact with the texture structure on the inner surface 211 of the top wall 211 and/or the inner surface 2121 of the outer wall 212. In contact, the glue covers the textured structure. When the glue is solidified to form a colloid, the colloid fixedly bonds the circuit board 120 and the cover 210, so that the structure of the point light-source 100 is stable. In addition, the glue and the textured structure are bonded and solidified to form a glue layer, and the glue layer can highlight the texture of the textured structure, improving the ornamental quality of the point light-source 100.

In one embodiment, the glue is poured into the sealed space 242 through the glue filling groove 2212 on the bottom wall 221 of the inner shell 220, and after the glue is solidified to form a colloid, the glue filling groove 2212 is closed by adhesive paper to avoid oxidation of the colloid and increase the service life. In one embodiment, the adhesive paper is a double-sided tape and, when using the point light-source 100, the rubber or the cover on the side of the double-sided tape that is not bonded to the filling glue groove 2212 can be torn off to bond the point light-source 100 on an external object.

In another embodiment, to quickly pour glue into the sealed space 242 through the glue filling groove 2212, so that the glue can quickly fill the sealed space 242, and also to make the adhesive paper firmly adhere to the glue filling groove 2212, the size of the glue filling groove 2212 can be adjusted adaptively, so that glue can be quickly poured into the sealed space 242 and the glue paper can be firmly bonded to the bottom wall 221 of the inner shell 220 to seal or cover the glue filling groove 2212.

In one embodiment, referring to FIG. 12 and FIG. 13, the outer wall 212 of the cover 210 is provided with a first wiring slot 2122, and the inner wall 222 of the inner shell 220 is provided with a second wiring slot 2222. The first wiring slot 2122 cooperates with the second wiring slot 2222 to form a wiring hole 243. Referring to FIG. 11, the external cable 300 can be introduced into the housing 200 through the wiring hole 243 to be electrically connected with the light emitting circuit on the circuit board 120. The shape of the wiring hole 243 corresponds to the shape of the external cable 300 so that the external cable 300 can be fixedly arranged in the point light-source 100 to prevent the external cable 300 from falling off.

In one embodiment, the external cable 300 is formed by arranging multiple sub-cables side by side, and the shape of the first wiring slot 2122 and the second wiring slot 2222 corresponds to the shape of the external cable 300, so that the line shape of the wiring hole 243 composed of the first wiring slot 2122 and the second wiring slot 2222 is also corresponding to the external cable 300. In one embodiment, the housing 200 is provided with two wiring holes 243.

Further, the external cable 300 may be arranged on the point light-source 100 before the glue is poured into the sealed space 242, so as to waterproof the external cable 300 through the glue and prevent water vapor from flowing into the circuit board 120 through the external cable 300.

In one embodiment, the cover 210 is integrally formed, and the inner shell 220 is also integrally formed, so as to facilitate the assembly and matching between the cover 210 and the inner shell 220, reducing production process steps of the point light-source 100, and reducing production costs.

Figure 16:
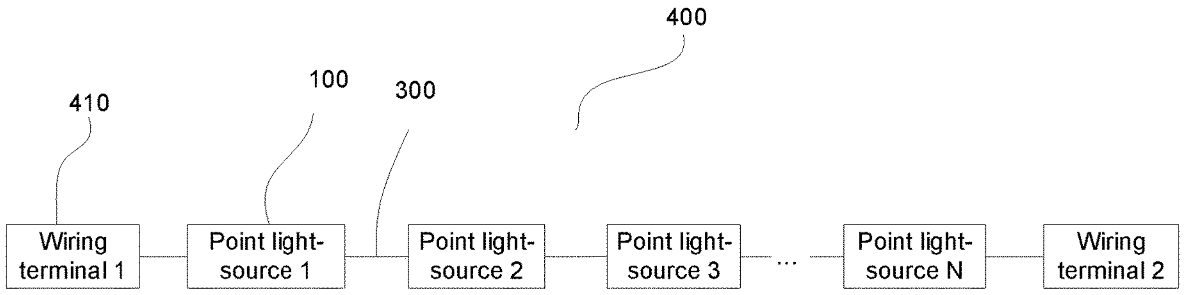
FIG. 16 illustrates a schematic circuit diagram of a point light-source light strip according to an embodiment of the present disclosure.

The present disclosure also provides a point light-source light strip 400. Referring to FIG. 16, the point light-source light strip 400 includes a plurality of point light-sources 100 connected in series, and two adjacent point light-sources 100 are electrically connected by a cable 300. Wiring terminals 410 are respectively provided at both ends of the point light-source light strip 400. In one embodiment, the number of point light-sources 100 in the point light-source light strip 400 is between 8-20. In one embodiment, 12 point light-sources 100 are included. In one embodiment, the wiring terminal 410 is a waterproof terminal.

When the point source light strip 400 needs to be connected with another point light-source light strip 400, the two point light-source light strips 400 are connected to each other through their respective wiring terminals 410 to form a longer light strip. When the point light-source light strip 400 is in a larger light strip and the point light-source 100 breaks down, the faulty point light-source light strip 400 can be removed from the larger light strip, and the faulty point light-source light string can be replaced by a non-faulty point light-source light strip.

Figure 17:
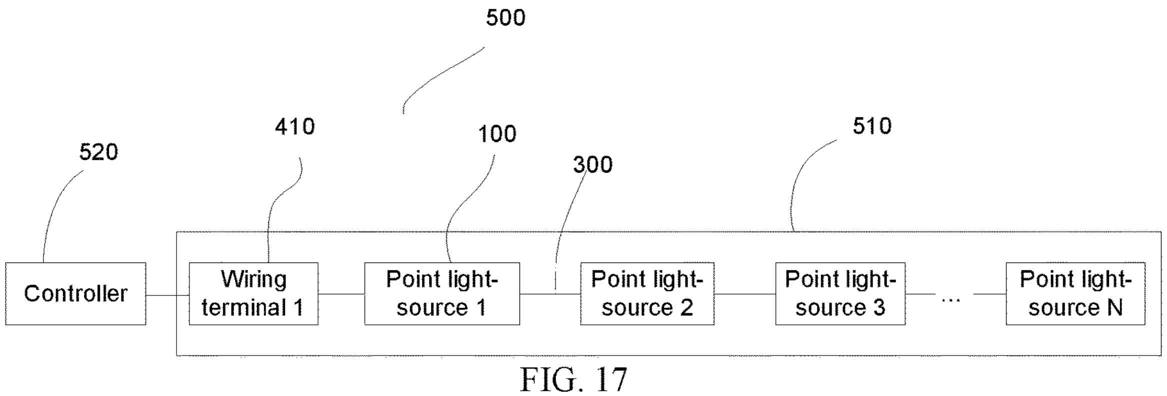
FIG. 17 illustrates a schematic circuit diagram of a point light-source assembly according to an embodiment of the present disclosure.

The present disclosure also provides a point light-source assembly 500. Referring to FIG. 17, the point light-source assembly 500 includes a controller 520 and a light strip 510. Two adjacent point light-sources 100 are electrically connected through a cable 300. One end of the light strip 510 is provided with a wiring terminal 410, and the wiring terminal 410 is electrically connected to a controller 520. The controller 520 is used to control each point light-source in the light strip 510 to emit corresponding light. In one embodiment, the number of point light-sources 100 in the point light-source light strip 400 is between 8-20, such as 12. In one embodiment, the wiring terminal 410 is a waterproof terminal.

In one embodiment, the other end of the light strip 510 is also electrically connected to a wiring terminal 410 (not shown).

Figure 18:
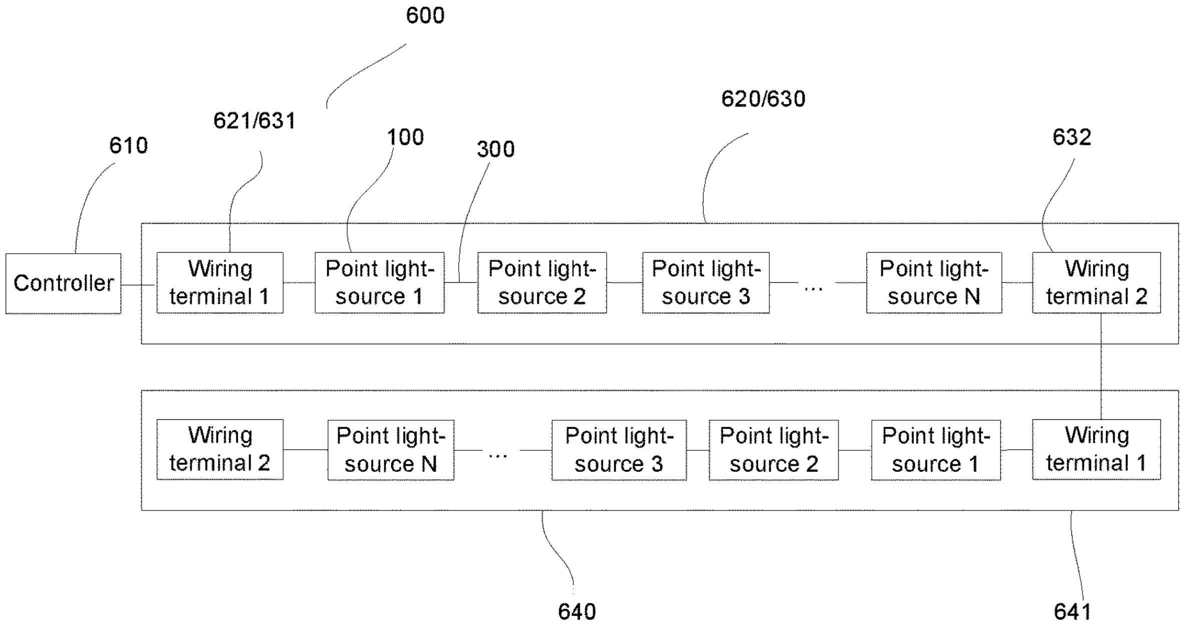
FIG. 18 illustrates a schematic circuit diagram of a point light-source system according to an embodiment of the present disclosure.

The present disclosure also provides a point light-source system 600. Referring to FIG. 18, the point light-source system 600 includes a controller 610 and a plurality of light strips 620, and the controller 610 is used to control the plurality of light strips 620 to emit light.

The light strip 620 includes a plurality of point light-sources 100 connected in series, two adjacent point light-sources 100 are electrically connected by a cable 300, and both ends of the light strip 620 are electrically connected to the wiring terminals 621 respectively. In one embodiment, the number of point light-sources 100 in the point light-source light strip 400 is between 8-20, such as 12. In one embodiment, the wiring terminal 410 is a waterproof terminal.

In one embodiment, the point light-source system 600 includes a first light strip 630 and a second light strip 640, the first wiring terminal 631 of the first light strip 630 is electrically connected to the controller 610, and the second wiring terminal 632 of the first light strip 630 is electrically connected to the first wiring terminal 641 of the second light strip 640. The controller 610 sequentially outputs control signals to the first light strip 630 and the second light strip 640 through the first terminal 631 of the first light strip 630 to control the first light strip 630 and the second light strip 640 to emit light.

Accordingly, according to embodiments of the present disclosure, the convex lens on the cover of the point light-source corresponds to the light-emitting unit on the circuit board, so that the light emitted by the light-emitting unit can be collected or gathered through the convex lens, and the light-emitting unit emits light to the outside through the convex lens, which can increase the brightness of light emitted by the point light-source and easiness of use.

Further, in the point light-source of the present disclosure, the convex lens and the cover are designed as an integrally formed structures. On the one hand, the installation of the point light-source becomes simple and convenient, thereby saving the process of coordinating the convex lens and the cover. On the other hand, due to the integrated structure, superior waterproof performance can be achieved, improving the waterproof ability of the point light-source.

Further, the circuit board of the point light-source abuts against the cover to form a sealed light-emitting space with the convex lens. The light-emitting unit is arranged in the light-emitting space, so that when glue is poured into the sealed space, the glue will not flow into the light-emitting space, and the light-emitting unit in the light-emitting space will not be affected by the glue to change the brightness. At the same time, the glue will form a colloid after solidification, and the colloid will prevent external water vapor from contacting the circuit board, effectively improving the waterproof performance of the point light-source. Moreover, the colloid can also be used in a buffer structure. When the point light-source is impacted by an external force, the colloid can buffer the external force so that the point light-source is not damaged.

It should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A point light-source, comprising:

a housing including an upper housing and a lower housing; and a light-emitting circuit packaged in the housing, wherein:

the light-emitting circuit includes a constant-current control chip, and a plurality of single-color light strings;

each single-color light string is composed of a plurality of light-emitting elements connected in series; and the constant-current control chip is configured to, in response to an external serial signal, generate pulse signals transmitted to each single-color light string so as to change a luminous brightness of each single-color light string correspondingly through each of the pulse signals, wherein:

the housing further comprises a convex lens arranged on the upper housing, the plurality of single-color light strings and the constant-current control chip are integrated on a circuit board, the circuit board is fixed on the lower housing, and the plurality of single-color light strings are arranged on one side of the convex lens, and wherein the housing further includes a glue filling groove arranged on the housing, and the glue filling groove is used to pour waterproof glue into the housing, so as to form a waterproof layer in the housing.

2. The point light-source according to claim 1, wherein the plurality of single-color light strings includes three single-color light strings, a red light string for emitting red light, a green light string for emitting green light, and a blue light strings for emitting blue light.

3. The point light-source according to claim 1, wherein a current limiting resistor is connected in series between each of the plurality of single-color light strings and the constant-current control chip, respectively.

4. The point light-source according to claim 1, wherein the plurality of single-color light strings are connected to a same filter circuit and are grounded through the same filter circuit.

5. The point light-source according to claim 1, wherein:

the constant-current control chip includes a signal modulation circuit, the signal modulation circuit is provided with a metal-oxide-semiconductor (MOS) transistor, and the constant-current control chip is configured to control a duty ratio of the pulse signal to a corresponding single-color light string by controlling a gate of the MOS transistor, wherein the duty ratio is associated with the luminous brightness of the corresponding single-color light string.

6. The point light-source according to claim 1, wherein:

the housing further includes a wiring slot arranged on the housing, and the wiring slot is used for introducing an external wire into the housing, such that the external wire is connected to the light-emitting circuit.

7. The point light-source according to claim 1, wherein a volume of the housing is between 0.1 and 15 $cm^3$.

8. A point light-source lamp, comprising a plurality of point light-sources according to claim 1, and a dimming controller, wherein:

the plurality of point light-sources are connected in series with wires, the dimming controller is electrically connected to the plurality of point light-sources, and the dimming controller is configured to send serial signals to the plurality of point light-sources to control light color, brightness, and/or frequency of each point light-source.

9. A point light-source, comprising:

a housing, and a circuit board arranged in the housing, wherein:

the circuit board is provided with a light-emitting circuit and a light-emitting unit electrically connected to the light-emitting circuit;

the housing includes a cover and an inner shell covered with the cover;

a convex lens is provided on the cover, the convex lens being integrally formed with the cover; and the light-emitting unit is arranged corresponding to the convex lens such that light emitted by the light-emitting unit is collected by the convex lens and transmitted to outside through the convex lens, wherein:

the cover is coupled with the inner shell to form a housing space for the circuit board, the circuit board abuts with the cover to divide the housing space into a sealed space and a closed light-emitting space, the light-emitting space is formed corresponding to the convex lens, the light-emitting unit is located in the light-emitting space, and the sealed space is filled with glue.

10. The point light-source according to claim 9, wherein:

a peripheral edge of the convex lens is recessed toward the inner shell relative to a top wall of the cover, and the circuit board is pressed against the peripheral edge of the convex lens to form the light-emitting space.

11. The point light-source according to claim 10, wherein:

the circuit board comprises a bearing portion and at least two mounting portions, the mounting portions are arranged with a supporting structure of the inner shell to mount the circuit board, and provided that S denotes an area of a projection of the convex lens on a first surface of the circuit board, and Q denotes an area of a projection of the top wall of the cover on the first surface of the circuit board, an area Z of the bearing portion is defined as: $S \leqslant Z \leqslant 0.65Q$.

12. The point light-source according to claim 9, wherein:

the inner shell is provided with a glue filling port, the glue is injected into the sealed space through the glue filling port, and the glue filling port extends in a predetermined direction so that equipment for injecting glue moves reciprocatively in the glue filling port.

13. The point light-source according to claim 9, wherein an inner surface of the cover is provided with a textured structure bonded with the glue.

14. The point light-source according to claim 7, wherein:

a fastening portion is provided on an outer surface of the inner shell, a matching portion is provided on an inner surface of the cover, and the fastening portion and the matching portion are buckled and connected together so that the cover and the inner shell are buckled and fixed together.

15. The point light-source according to claim 9, wherein:

a first wiring slot is provided on the cover, a second wiring slot is arranged on the inner shell, the first wiring slot and the second wiring slot are joined to form a wiring hole, and the wiring hole is used to lead an external cable into the housing, so that the external cable is electrically connected to the light-emitting circuit.

16. A point light-source assembly, comprising a plurality of point light-sources according to claim 9, and a controller, wherein:

the plurality of point light-sources are connected in series through wires, and the controller is electrically connected to the point light-source located at an end of the plurality of point light-sources, and is configured to control the plurality of point light-sources to emit light.

17. A point light-source system, comprising at least two light strips each containing a plurality of point light-sources and a controller, wherein each point light-source includes a housing, and a circuit board arranged in the housing; the circuit board is provided with a light-emitting circuit and a light-emitting unit electrically connected to the light-emitting circuit the housing includes a cover and an inner shell covered with the cover; a convex lens is provided on the cover, the convex lens being integrally formed with the cover; and the light-emitting unit is arranged corresponding to the convex lens such that light emitted by the light-emitting unit is collected by the convex lens and transmitted to outside through the convex lens, wherein:

the controller is configured to control the at least two light strips to emit light, the plurality of point light-sources in each light strip are connected in series through wires, a first end of each light strip is electrically connected to a first wiring terminal, and a second end of each light strip is electrically connected to a second wiring terminal, and the at least two light strips include a first light strip and a second light strip, the first wiring terminal of the first light strip is electrically connected to the controller, and the second wiring terminal of the first light strip is electrically connected to the first wiring terminal of the second light strip.

* * * * *